United States Patent Office 3,365,181
Patented Jan. 23, 1968

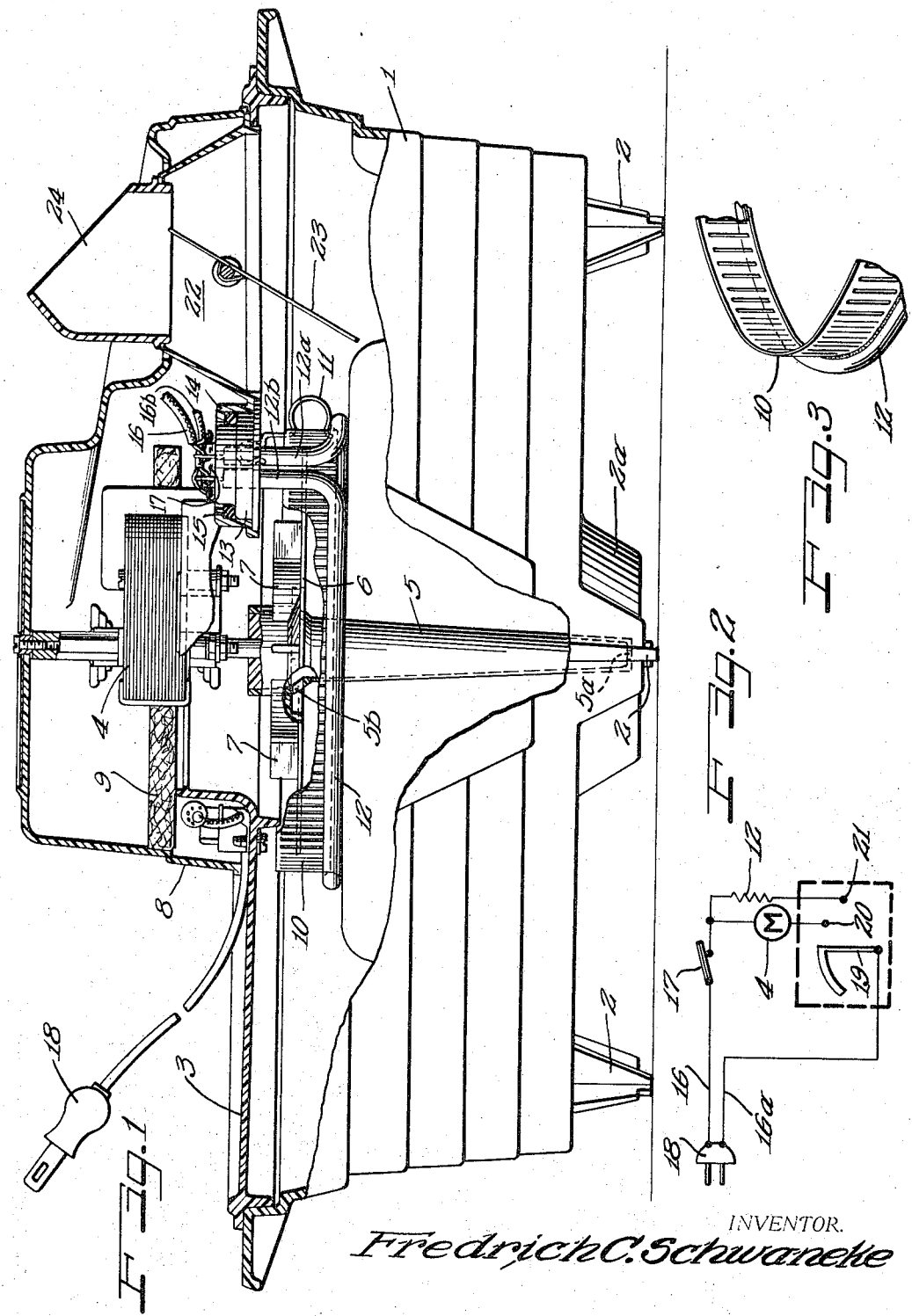

3,365,181
VAPORIZER
Fredrich C. Schwaneke, Chicago, Ill., assignor to Northern Electric Company, Chicago, Ill., a corporation of Delaware
Filed July 20, 1965, Ser. No. 473,390
2 Claims. (Cl. 261—130)

This invention relates to a vaporizer and specifically to a portable self-contained device which may be used to supply water vapor at various temperatures to increase the humidity of the air in a room. Vaporizers which have heretofore been provided to supply heated water vapor have had no provision for supplying water vapor that is unheated. These are objectionable in warm dry weather since the desired cooling effect is minimized or overcome by the added heat.

Likewise, vaporizers which have been provide to supply only unheated vapor are objectionable in that the introduction of such vapor into a room has the effect of lowering the temperature thereof which is undesirable in cold weather. Futhermore, such unheated vapor frequently includes droplets which are damaging to furniture and room decorations.

It is therefore an important object of this invention to provide a vaporizer capable of producing both heated and unheated vapor at will of the operator.

It is a further object of this invention to provide a vaporizer of such construction as to minimize the inclusion of droplets with the discharged water vapor.

It is another object of this invention to provide a vaporizer incoporating control means whereby a pump motor and a heating element may be selectively energized so that either unheated or heated vapor may be provided.

It is also an object of this invention to provide a vaporizer for producing heated vapor incorporating a thermostatic limit switch for deenergizing the heating element and pump motor when a predetermined temperature is exceeded.

Another important object of this invention resides in the provision of a vaporizer including means for varying the quantity of vapor discharged into a room served thereby.

Other and further important objects of this invention will be apparent from the specification and the accompanying drawings.

The invention (in a preferred form) is shown on the drawings and will be hereinafter more fully described.

On the drawings:

FIG. 1 is a side elevation view with parts in section and with parts cut away showing the general construction and arrangement of a vaporizer incorporating the present invention;

FIG. 2 is a wiring diagram showing the motor and heating element controls; and

FIG. 3 is a fragmentary perspective view showing the vapor breaking screen and a portion of the heating element attached thereto.

As shown on the drawings:

The vaporizer of this invention generally consists of a cylindrical fluid container or vessel 1 which preferably is supported in a position somewhat elevated from a floor or table by legs 2, thus permitting the container 1 to have a bottom sump 2a.

The container 1 is provided with a cover 3 which provides a support for a motor 4 which drives a cone-type of centrifugal pump 5 having a fluid inlet 5a within the sump 2a of the container 1. Upon energization of the motor, rotation of the member 5 causes fluid entering the inlet 5a to move upwardly along the inner wall of the conical member 5 to be discharged through openings 5b under the underside of a rotating plate 6 where it is carried outwardly to be admixed with incoming air and vaporized in a manner now to be described.

Mounted on the upper side of the plate 6 and rotatable therewith and with the pump are a series of rigid vanes 7 which draw air into the container and throw it outwardly into contact with the fluid which moves out on the underside of the plate 6, thus effecting atomization of a portion of such fluid, the remainder of the fluid dropping back into the body of the fluid within the container. The air reaching the interior of the container enters the same through appropriate passages (not shown) in the lower edge of a motor cover 8 and in so entering the interior of the container 1, such air must pass through an air filter 9 of suitable construction.

Atomized fluid and air produced by an admixture of air drawn in and thrown outwardly by the vanes 7 and the fluid which which travels out on the underside of the plate 6 is impinged against a slotted screen 10 which is supported by a series of clips extending through the slots in the screen and engaging the cover member 3. One of these clips is shown at 11 in FIG. 1 and it is understood that a plurality thereof are provided in order to support the screen 10 from the cover 3. The screen 10 has the effect of breaking up the atomized water vapor mixture and removing droplets therefrom so as to prevent the discharge of such droplets into a room served by the vaporizer.

Carried by the screen 11 and secured in intimate contact therewith as by brazing, soldering or the like is a metal sheathed heating element 12 of a well-known commercial type having a cylindrical metal sheathing of copper or aluminum and which contains a resistance element embedded in a powdered material such as magnesium oxide. These elements which are readily obtainable commercially are frequently referred to under the trade name "Calrod." The heating element 12 has vertically extending terminal members 12a and 12b, the ends of which are mounted in a disk-like member 13 in a casing 14 mounted inside the motor cover and shielded against the ingress of moisture by an O-ring 15 as shown in FIG. 1. The terminals 12a and 12b are connected to conductors 16 and 16a through a bimetallic thermostatic limit switch 17 which also controls the circuit for energizing the motor 4 as shown in the wiring diagram of FIG. 2.

It will be noted from FIG. 1 that the position of the thermostatic limit switch 17 is such that it is not only influenced by heat carried to it through the sheathing of the heating element 12 but is also indirectly under influence of heat developed by the motor. Thus, if there should be a failure of the motor 4, the pump would not throw water out through the screen 10 and the heating element would rapidly heat up so that the heat would be conveyed through the sheath thereof to the proximity of the thermostatic limit switch 17 and at the same time heat developed within the motor windings would by convection also tend to raise the temperature in the proximity of said thermostatic limit switch 17.

The conductors 16 and 16a are connected to a source of electric energy by a standard plug 18 and as shown in FIG. 2, the circuit is further controlled by a two-step rotary switch 19 which may be moved to a contact point 20 to energize the motor 4 alone or also to a contact 21 (with the contact point 20 still energized) to energize both the motor circuit and the circuit for the heating element 12. In the event that the predetermined temperature within the cover (and the container) is exceeded as, for example, upon the exhausting of the water supply within the container 1, then the thermostatic limit switch 17 opens to deenergize the circuits regardless of the fact that the switch 19 is moved into position to connect both contacts 20 and 21.

Vapor formed within the container 1 escapes therefrom through a passage 22 provided in the container cover and the escape of vapor through that passage is regulated by a manually adjustable throttle valve 23.

In order to direct the discharge of vapor in a predetermined direction in the room in which the vaporizer is mounted, a passage 22 is completed through a rotatably mounted angle fitting 24 which may be rotated about a vertical axis through 360° to permit of its discharge opening pointing upwardly and angularly in any desired direction into the room.

If desired, and in order to prevent the collection of droplets thereon and prevent the accumulation of scale thereon, the heating element 12 may be provided with a covering material of hydrophobic heat-resistant polymeric resin. Such a resin coating is commercially available, being sold under the trademark "Teflon" and consisting of polytetrafluoroethylene or a similar material may be used comprising a copolymer of polytetrafluoroethylene and polyhexafluoropropylene.

By utilization of the heating means of this invention, it is possible to introduce larger quantities of water into the room and thus increase the humidity thereof. For example, we have found that using a heating element of 500 watts capacity, the output of water introduced into the room by the vaporizer increases from approximately 1¼ pounds to 2½ pounds per hour, that is, approximately doubles the output achieved with an unheated vaporizer. At 1350 watts, the output increases to approximately 5 pounds per hour.

It is, of course, appreciated that the introduction of this heated vapor into a room tends to somewhat increase the temperature thereof in that the heat added to the vapor tends to neutralize the cooling effect of the heat of vaporization. Therefore, in hot dry weather, it is sometimes desirable to use the vaporize with the heating element deenergized so as to take advantage of the effect of heat of vaporization even though a lesser amount of water vapor is introduced into the room. Thus, the vaporizer of this invention which gives the operator an option of either using the heating element or not, as may be desired (through simple actuation of the switch 19), provides a unit which is adaptable to a wide range of operating conditions.

When used with the heater, the efficiency of this vaporizer is further enhanced by the fact that that portion of the water carried out on the underside of the blade 6 which is not vaporized is nevertheless heated to some extent and drops back into the body of the water within the container 1, thus continually tending to increase the temperature of that water and to thus increase the amount thereof that may be carried into the room by a given volume of air. The fact that these desired results may be achieved by a portable unit of simple construction which is effectively protected against overheating as, for example, upon failure of the motor or exhaustion of the water supply makes the unit a very desirable one for home and office use. The breaking up of droplets by the screen which is enhanced by the effect of the heating element, prevents the deposit of droplets in the room to which water vapor is being added.

I am aware that various details of construction may be changed without departing from the principles of this invention and I therefore do not propose to limit the patent granted hereon otherwise than necessitated by the scope of the claims.

I claim:
1. In a vaporizer,
a fluid container,
a cover therefor,
an electric motor carried by the cover and enclosed thereby,
air inlet means in the cover through which air may be drawn into the container,
air filter means between said inlet means and the container,
a rotatable plate drivably connected to said motor and disposed in the container, a fluid elevating pump on the underside of said plate for propelling said fluid outwardly,
vanes on the upper side of said plate, rotatable therewith to draw air into the container and propel it outwardly to admix with fluid at the periphery of the plate,
a stationary screen carried by the cover and surrounding the plate above the liquid level of the container and extending a short distance above and below the outer edge of the plate,
an electric heating element permanently affixed to the lower edge of the screen below the path of fluid propelled by the plate,
a two-step switch connected by separate parallel circuit branches which respectively include the motor and the heating element and connected in one setting to energize both the motor and the heating element and in another setting to energize the motor alone, and
outlet means in the cover to permit of the discharge of humidified air.

2. The structure of claim 1 including a thermostatic limit switch positioned immediately adjacent to and between the heating element and the motor and connected in series with said parallel branches to deenergize the motor and heating element at a predetermined abnormally high temperature produced by either of said motor and said heating element.

References Cited

UNITED STATES PATENTS

| | | | |
|---|---|---|---|
| 1,955,518 | 4/1934 | Sherwood | 261—91 |
| 2,105,992 | 1/1938 | Tolman | 261—91 X |
| 2,246,069 | 6/1941 | Schechtel et al. | 261—30 |
| 2,296,930 | 9/1942 | Ihler | 261—91 X |
| 2,417,126 | 3/1947 | Richards | 261—91 |
| 2,860,228 | 11/1958 | Boyle et al. | 261—142 X |
| 2,888,367 | 5/1959 | Greyson | 117—232 X |
| 2,967,051 | 1/1961 | Mobley | 261—142 |
| 3,137,120 | 6/1964 | Budenbender | 117—232 X |
| 3,188,007 | 6/1965 | Myklebust | 261—91 X |
| 3,193,261 | 7/1965 | Nesbitt | 261—142 |
| 3,215,416 | 11/1965 | Liben | 261—130 X |
| 3,229,450 | 1/1966 | Stern | 261—91 X |

RONALD R. WEAVER, *Primary Examiner.*

HARRY B. THORNTON, *Examiner.*